(12) United States Patent
Li

(10) Patent No.: US 11,977,941 B1
(45) Date of Patent: May 7, 2024

(54) RADIO FREQUENCY IDENTIFICATION SWITCH TAG DEVICE

(71) Applicant: Bing xuan Li, Hsinchu (CN)

(72) Inventor: Bing xuan Li, Hsinchu (CN)

( * ) Notice: Subject to any disclaimer, the term of this patent is extended or adjusted under 35 U.S.C. 154(b) by 0 days.

(21) Appl. No.: 18/398,240

(22) Filed: Dec. 28, 2023

(51) Int. Cl.
*G06K 19/077* (2006.01)

(52) U.S. Cl.
CPC . *G06K 19/07749* (2013.01); *G06K 19/07722* (2013.01)

(58) Field of Classification Search
CPC .............. G06K 19/07722; G06K 19/07749
USPC .................................. 235/492, 451
See application file for complete search history.

(56) References Cited

U.S. PATENT DOCUMENTS

| 11,403,506 B2 * | 8/2022 | Nyalamadugu .. G06K 19/07767 |
| 11,663,440 B1 | 5/2023 | Li |
| 2017/0098106 A1 * | 4/2017 | Roesner ............. G06K 7/10237 |
| 2020/0074258 A1 | 3/2020 | Nyalamadugu et al. |
| 2022/0253660 A1 | 8/2022 | Nyalamadugu et al. |

FOREIGN PATENT DOCUMENTS

CN  113193356 A  7/2021

* cited by examiner

*Primary Examiner* — Toan C Ly
(74) *Attorney, Agent, or Firm* — Zhigang Ma

(57) ABSTRACT

A RFID switch tag device includes a first cover and a second cover, a tag circuit, and an activation circuitry. The first and second covers cooperatively define therein an accommodating space. The tag circuit is disposed in the accommodating space and fixed onto the second cover. The tag circuit includes: a signal enhance circuitry, and at least one ultra-high frequency RFID module spaced from the signal enhance circuitry. The activation circuitry is disposed in the accommodating space, and the activation circuitry couples the signal enhance circuitry with one of the at least one ultra-high frequency RFID module.

20 Claims, 13 Drawing Sheets

RADIO FREQUENCY IDENTIFICATION SWITCH TAG DEVICE

TECHNICAL FIELD

The present disclosure relates to the field of radio frequency identification technologies, and particularly to a radio frequency identification (RFID) switch tag device.

DESCRIPTION OF RELATED ART

At present, a RFID technology uses electromagnetic fields to transmit data wirelessly. One of main uses of the RFID technology is to automatically identify and track objects through a RFID tag device, which can be attached or incorporated into various objects. For example, the various objects include credit cards, passports, license plates, identification (ID) cards, cell phones/mobile devices, etc. The RFID technology can also be applied in many fields including but not limited to electronic toll collection, parking charges, border control, payment processing, asset management, and transportation. For example, a vehicle license plate that includes the RFID tag device can be used for electronic toll collection (ETC), electronic vehicle registration (EVR), transit, and other purposes.

However, the existing RFID tag device has no complete function, and is low in intelligence and practicability, thereby does not meet the requirements of social development.

SUMMARY

An objective of the present disclosure is to provide a RFID switch tag device, which may have complete functions, and be convenient in use.

In a first aspect, an embodiment of the present disclosure provides a RFID switch tag device. The RFID switch tag device includes: a first cover and a second cover, a tag circuit, and an activation circuitry. The first cover and the second cover cooperatively define therein an accommodating space. The tag circuit is disposed in the accommodating space and fixed onto the second cover. The tag circuit includes: a signal enhance circuitry, and at least one ultra-high frequency RFID module spaced from the signal enhance circuitry. The activation circuitry is disposed in the accommodating space, and the activation circuitry couples the signal enhance circuitry with one of the at least one ultra-high frequency RFID module.

In an exemplary embodiment of the present disclosure, the tag circuit is, through adhesive, fixed onto the second cover.

In an exemplary embodiment of the present disclosure, the tag circuit includes: a base, and a double-sided adhesive layer; the at least one ultra-high frequency RFID module and the signal enhance circuitry are arranged between the base and the double-sided adhesive layer; and the double-sided adhesive layer is pasted onto the second cover.

In an exemplary embodiment of the present disclosure, each of the at least one ultra-high frequency RFID module includes: a RFID tag chip, and an antenna formed by trace lines; the RFID tag chip is electrically connected with the antenna, and the antenna and the signal enhance circuitry are conductive patterns coplanar on the base.

In an exemplary embodiment of the present disclosure, the RFID switch tag device further includes a slider; the slider includes a substrate and a button; the substrate is disposed in the accommodating space; and the button is disposed protruding on a side of the substrate facing towards the first cover; the first cover is defined with an opening, the button is arranged penetrating through the opening of the first cover, and the activation circuitry is fixedly connected to a side of the substrate facing away from the first cover.

In an exemplary embodiment of the present disclosure, the RFID switch tag device further includes: at least one color-indicator, disposed on a side of the slider facing towards the second cover; the second cover is disposed with a window (also referred as to reinforced window), and the window is configured to allow a corresponding one of the at least one color-indicator to be observed therethrough when the activation circuitry couples the signal enhance circuitry with one of the at least one ultra-high frequency RFID module.

In an exemplary embodiment of the present disclosure, the activation circuitry includes: a base, a double-sided adhesive layer, and a printed conductive pattern arranged between the base and the double-sided adhesive layer; the double-sided adhesive layer is pasted onto the side of the substrate facing away from the first cover; and the printed conductive pattern is in an open-ring shape.

In an exemplary embodiment of the present disclosure, the printed conductive pattern includes a first portion, a second portion, and a third portion connecting the first portion with the second portion; the first portion and the second portion are spaced from each other and define a gap therebetween; and a line width of each of the first portion and the second portion is larger than a line width of the third portion.

In an exemplary embodiment of the present disclosure, the at least one ultra-high frequency RFID module is multiple ultra-high frequency RFID modules, a length of the printed conductive pattern is greater than a length of each of the multiple ultra-high frequency RFID modules, the line width of each of the first portion and the second portion is greater than a width of each of the multiple ultra-high frequency RFID modules; and the activation circuitry couples the signal enhance circuitry with one of the at least one ultra-high frequency RFID module by overlapping the printed conductive pattern with both the signal enhance circuitry and the one of the at least one ultra-high frequency RFID module.

In an exemplary embodiment of the present disclosure, the at least one ultra-high frequency RFID module is multiple ultra-high frequency RFID modules, the slider is movable relative to the first cover and thereby switchable among a plurality of positions of the first cover, and the activation circuitry couples the signal enhance circuitry with a corresponding one of the multiple ultra-high frequency RFID modules when the slider is in any one of the plurality of positions.

In an exemplary embodiment of the present disclosure, the RFID switch tag device further includes: multiple color-indicators, disposed on a side of the slider facing towards the second cover; the second cover is disposed with a window, and a corresponding one of the multiple color-indicators is observed through the window of the second cover and a transparent portion of the tag circuit when the slider is in any one of the plurality of positions.

In an exemplary embodiment of the present disclosure, each of the multiple ultra-high frequency RFID modules includes: a RFID tag chip, and an antenna formed by trace lines; the antenna is electrically connected with the RFID tag chip, and the RFID tag chips of the multiple ultra-high frequency RFID modules respectively are stored with different groups of tag data, and each group of data in the different groups of tag data comprise an electronic product code (EPC) and a tag identifier (TID).

In an exemplary embodiment of the present disclosure, each of the multiple ultra-high frequency RFID modules is operative at a frequency of 915 megahertz (MHz) or 2.45 gigahertz (GHz).

In an exemplary embodiment of the present disclosure, the RFID switch tag device further includes a holder, and the first cover and the second cover together are detachably supported on the holder.

In a second aspect, an embodiment of the present disclosure provides a RFID switch tag device, including: a first cover and a second cover, a tag circuit, and an activation circuitry. The first cover and the second cover cooperatively define therein an accommodating space. The tag circuit is disposed in the accommodating space and attached onto the second cover by adhesive. The tag circuit includes: a signal enhance circuitry, and at least one ultra-high frequency RFID module spaced from the signal enhance circuitry. Each of at least one ultra-high frequency RFID module includes a RFID tag chip and an antenna formed by trace lines, the antenna is electrically connected with the RFID tag chip, and the signal enhance circuitry and the antenna are conductive patterns coplanar. The activation circuitry is disposed in the accommodating space and configured to couple the signal enhance circuitry with one of the at least one ultra-high frequency RFID module.

In an exemplary embodiment of the present disclosure, the RFID switch tag device further includes a slider; the slider includes a substrate and a button; the substrate is disposed in the accommodating space; and the button is disposed protruding on a side of the substrate facing towards the first cover; the first cover is defined with an opening, the button is arranged penetrating through the opening of the first cover, and the activation circuitry is fixed onto a side of the substrate facing away from the first cover.

In an exemplary embodiment of the present disclosure, the at least one ultra-high frequency RFID module is multiple ultra-high frequency RFID modules, the slider is movable relative to the first cover and thereby switchable among a plurality of positions of the first cover, and the activation circuitry couples the signal enhance circuitry with a corresponding one of the multiple ultra-high frequency RFID modules when the slider is in any one of the plurality of positions.

In an exemplary embodiment of the present disclosure, the RFID switch tag device further includes: at least one color-indicator, disposed on a side of the slider facing towards the second cover; the second cover is disposed with a window, and the window is configured to allow a corresponding one of the at least one color-indicator to be observed therethrough when the activation circuitry couples the signal enhance circuitry with one of the at least one ultra-high frequency RFID module.

In an exemplary embodiment of the present disclosure, the activation circuitry includes: a base, a double-sided adhesive layer, and a printed conductive pattern arranged between the base and the double-sided adhesive layer; the double-sided adhesive layer is pasted onto the side of the substrate facing away from the first cover, and the printed conductive pattern is in an open-ring shape.

In an exemplary embodiment of the present disclosure, the printed conductive pattern includes a first portion, a second portion, and a third portion connecting the first portion with the second portion; the first portion and the second portion are spaced from each other and define a gap therebetween; the at least one ultra-high frequency RFID module is multiple ultra-high frequency RFID modules, a length of the printed conductive pattern is greater than a length of each of the multiple ultra-high frequency RFID modules, a line width of each of the first portion and the second portion is greater than a width of each of the multiple ultra-high frequency RFID modules; and the activation circuitry couples the signal enhance circuitry with one of the at least one ultra-high frequency RFID module by overlapping the printed conductive pattern with both the signal enhance circuitry and the one of the at least one ultra-high frequency RFID module.

In a third aspect, an embodiment of the present disclosure provides a RFID switch tag device, including: a first cover and a second cover, a tag circuit, a slider, and an activation circuitry. The first cover and the second cover cooperatively define therein an accommodating space. The tag circuit is disposed in the accommodating space and fixed onto the second cover. The tag circuit includes: a signal enhance circuitry, and multiple ultra-high frequency RFID modules spaced from the signal enhance circuitry. The slider is slidably mounted on the first cover. The activation circuitry is disposed in the accommodating space and fixed onto the slider. The activation circuitry is configured to switchably couple the signal enhance circuitry with one of the multiple ultra-high frequency RFID modules. The activation circuitry includes: a base, a double-sided adhesive layer, and a conductive pattern arranged between the base and the double-sided adhesive layer; the double-sided adhesive layer is pasted onto the slider, and the conductive pattern is in an open-ring shape.

In an exemplary embodiment of the present disclosure, the slider is switchable among a plurality of positions of the first cover, and the activation circuitry couples the signal enhance circuitry with a corresponding one of the multiple ultra-high frequency RFID modules when the slider is in any one of the plurality of positions; the RFID switch tag device further includes: multiple color-indicators, disposed on a side of the slider facing towards the second cover; the second cover is disposed with a window, and a corresponding one of the multiple color-indicators is observed through the window of the second cover when the slider is in any one of the plurality of positions; the conductive pattern includes a first portion, a second portion, and a third portion connecting the first portion with the second portion; the first portion and the second portion are spaced from each other and define a gap therebetween, and a line width of each of the first portion and the second portion is larger than a line width of the third portion.

The present disclosure may have at least one of the following beneficial effects. 1) The RFID switch tag device is disposed with the activation circuitry, the signal enhance circuitry and the at least one ultra-high frequency RFID module, so that each of the at least one ultra-high frequency module can be coupled with the signal enhance circuitry via the activation circuitry to form an UHF system having desired performances, such as a long operating range. 2) The slider is movable relative to the first cover of the RFID switch tag device and thereby switchable among multiple positions of the first cover, which makes the activation circuitry move relative to the tag circuit and thereby switchably couple one of the at least one ultra-high frequency RFID module with the signal enhance circuitry; therefore, an operation of the RFID switch tag device is convenient. 3) The RFID switch tag device has multiple, e.g., three ultra-high frequency RFID modules respectively stored with different groups of tag data each including a EPC and a TID, the multiple ultra-high frequency RFID modules can be switchably used for a single-occupancy vehicle (SOV) lane and a high-occupancy vehicle (HOV) lane, for example, they can be used for the HOV lane to get different charge discounts based on the number of personnel in a vehicle; as such, it is only required one RFID switch tag device to apply for different travel conditions, rather than multiple RFID tag devices for the different travel conditions, thereby simplifying the operation of the user and reducing the device cost. 4) At least one color-indicator is provided in the RFID switch tag device and can be observed through the window of the second cover, the combination of the at least one color-indicator and the window facilitates a reinforced declaration of the number of personnel in a vehicle. 5) The tag circuit including the signal enhance circuitry and the at least one ultra-high frequency RFID module is disposed in the accommodating space defined by the first cover and the second cover and fixed onto the second cover, which can simplify the structure of the RFID switch tag device and is easy to use by users.

BRIEF DESCRIPTION OF DRAWINGS

In order to more clearly explain embodiments of the present disclosure, accompanying drawings that need to be used in the description of the embodiments are briefly introduced hereinafter. It is apparent that the accompanying drawings in the following description are merely some embodiments of the present disclosure, and for those skilled in the art, other drawings can also be obtained according to structures shown in these introduced drawings without creative efforts.

DETAILED DESCRIPTION OF EMBODIMENTS

Technical solutions in embodiments of the present disclosure will be clearly and completely described below in combination with the accompanying drawings in the embodiments of the present disclosure. It is apparent that the described embodiments are merely some of embodiments of the present disclosure, not all of embodiments of the present disclosure. Based on the described embodiments of the present disclosure, all other embodiments obtained by those skilled in the art without creative efforts shall fall within the scope of protection of the present disclosure.

Figure 1:
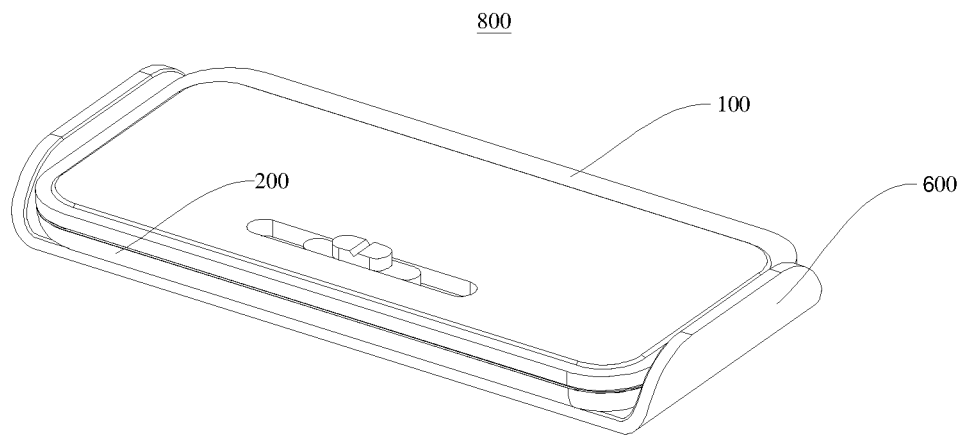
FIG. 1 illustrates a schematic structural perspective view of a RFID switch tag device according to an embodiment of the present disclosure.
Figure 2:
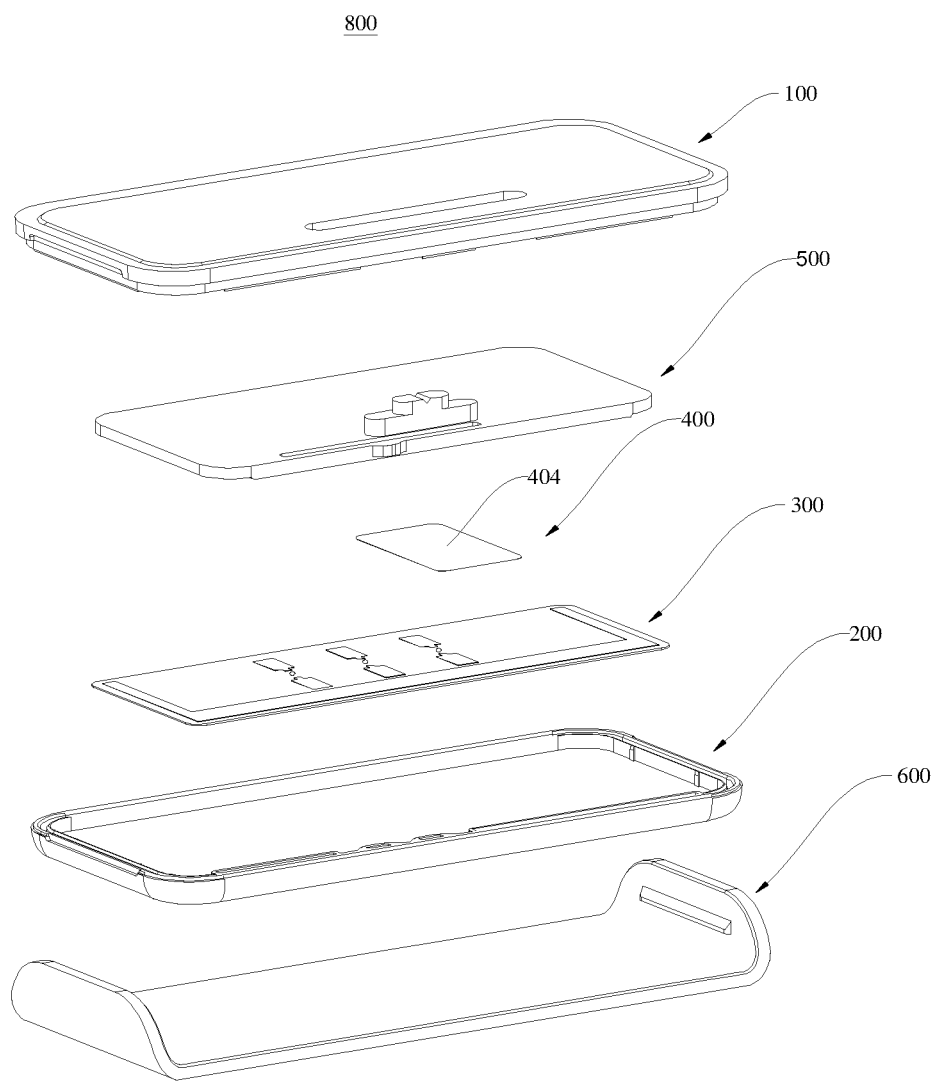
FIG. 2 illustrates a schematic structural exploded view of the RFID switch tag device of FIG. 1 in a first view angle according to an embodiment of the present disclosure.
Figure 3:
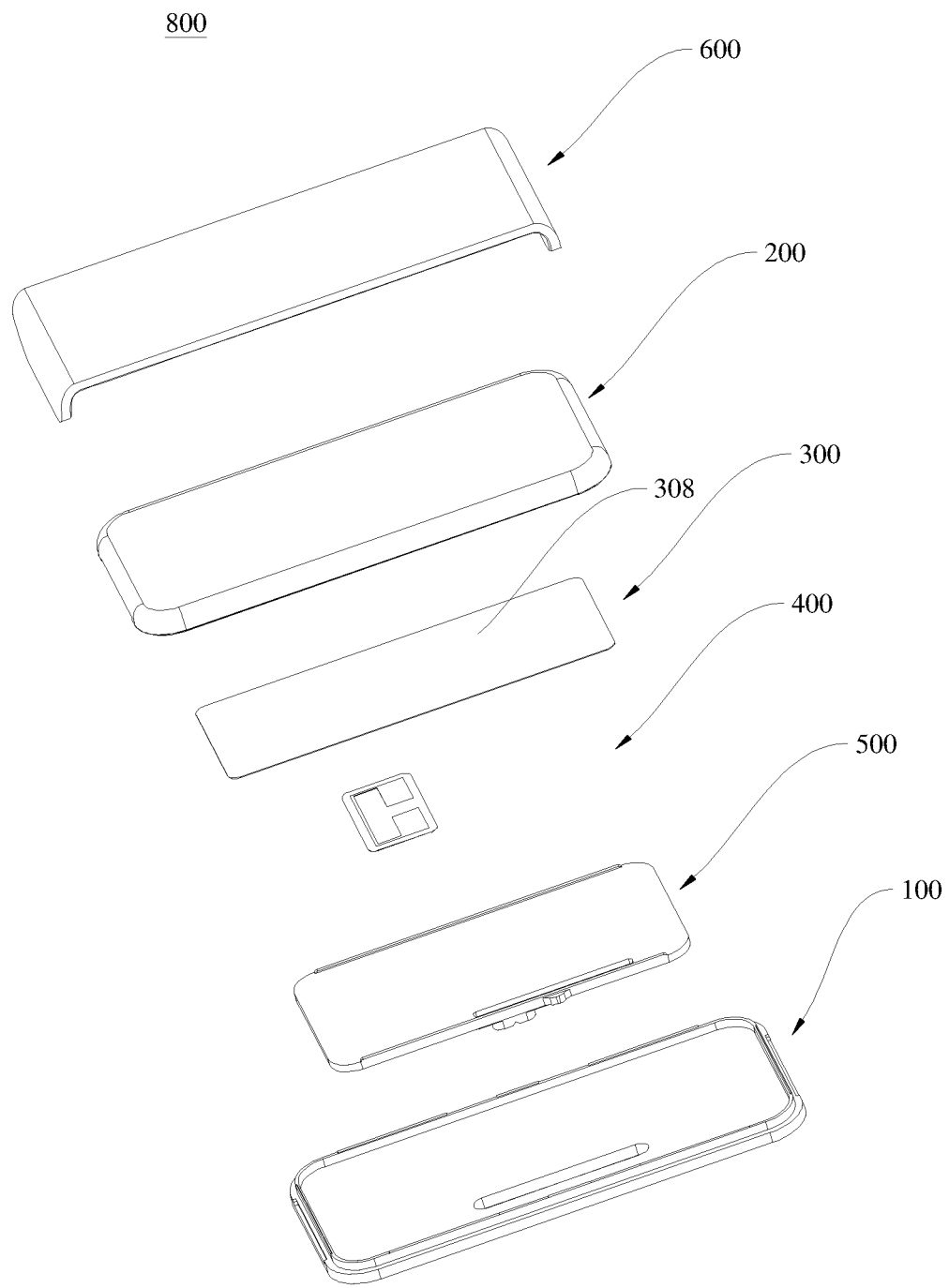
FIG. 3 illustrates another schematic structural exploded view of the RFID switch tag device of FIG. 1 in a second view angle according to an embodiment of the present disclosure.
Figure 4:
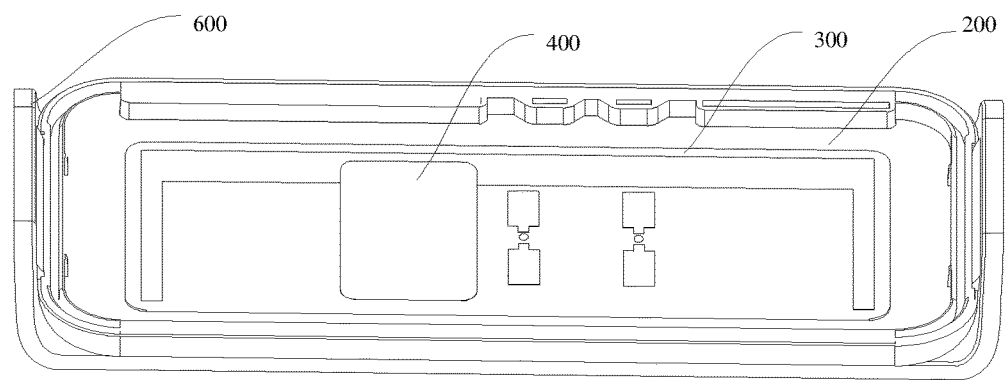
FIG. 4 illustrates a positional relationship between a tag circuit and an activation circuitry of the RFID switch tag device of FIG. 2 according to an embodiment of the present disclosure.
Figure 5:
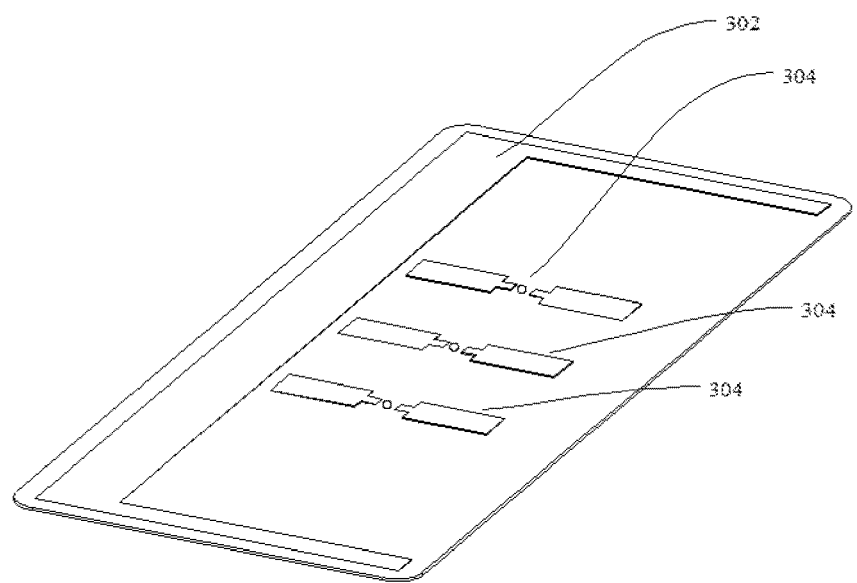
FIG. 5 illustrates a schematic structural top view of the tag circuit with three ultra-high frequency RFID modules in FIG. 2 according to an embodiment of the present disclosure.
Figure 6:
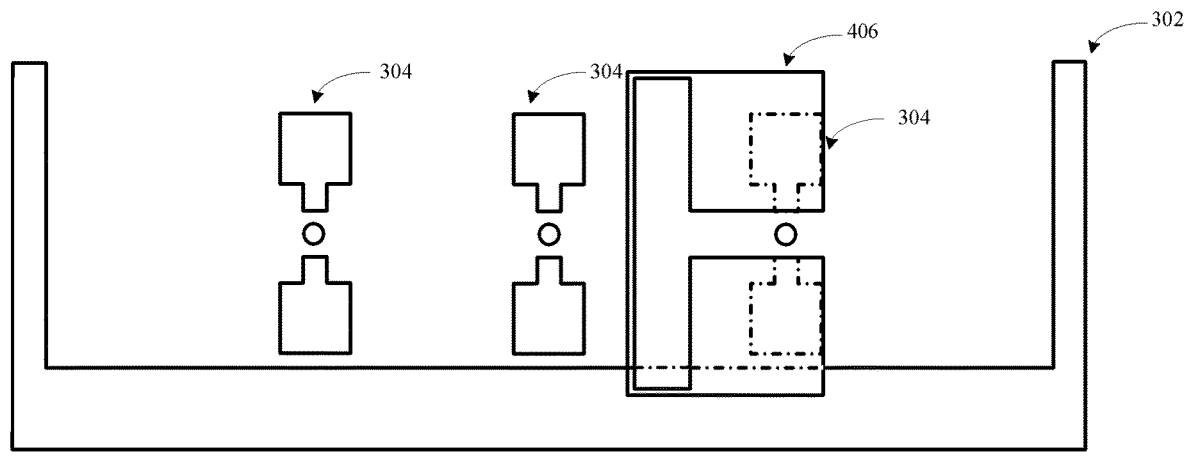
FIG. 6 illustrates a positional relationship between a printed conductive pattern of the activation circuitry in FIG. 3 and the tag circuit of in FIG. 2 in case of coupling according to an embodiment of the present disclosure.

Referring to FIG. 1 through FIG. 6, a RFID switch tag device 800 according to an embodiment of the present disclosure is shown. Specifically, the RFID switch tag device 800 includes: a first cover 100, a second cover 200, a tag circuit 300, and an activation circuitry 400. The first cover 100 and the second cover 200 cooperatively defines therein an accommodating space. The tag circuit 300 is disposed in the accommodating space and fixed onto the second cover 200. The tag circuit 300 includes a signal enhance circuitry 302, and at least one ultra-high frequency RFID module 304, e.g., three ultra-high frequency RFID modules 304 spaced from the signal enhance circuitry 302. The signal enhance circuitry 302 may be a UHF booster, which may include a passive booster, an active booster, or a battery-assisted passive booster, which is not limited herein. The activation circuitry 400 is disposed in the accommodating space and located on a side of the tag circuit 300 facing towards the first cover 100. The activation circuitry 400 disposed in the accommodating space couples the signal enhance circuitry 302 with one of the three ultra-high frequency RFID modules 304, for example, when the activation circuitry 400, e.g., a printed conductive pattern 406 of the activation circuitry 400 as shown in FIG. 6 is in a state of overlapping with both the signal enhance circuitry 302 and one of the three ultra-high frequency RFID modules 304, the signal enhance circuitry 302 couples with the one of the three ultra-high frequency RFID modules 304. In the illustrated embodiment, the RFID switch tag device 800 has three ultra-high frequency RFID modules 304, the three ultra-high frequency RFID modules can be switchably used for a SOV lane and a HOV lane, for example, they can be used for the HOV lane to get different charge discounts based on the number of personnel in a vehicle; as such, it is only required one RFID switch tag device to apply for different travel conditions, rather than multiple RFID tag devices for the different travel conditions, thereby simplifying the operation of the user and reducing the device cost. In other embodiments, the at least one ultra-high frequency RFID module 304 may be two ultra-high frequency RFID modules 304 as shown in FIG. 7, or one ultra-high frequency RFID module 304 as shown in FIG. 8, or other number of ultra-high frequency RFID modules instead.

Since the tag circuit 300 including the signal enhance circuitry 302 and the at least one ultra-high frequency RFID module 304 is disposed in the accommodating space defined by the first cover 100 and the second cover 200 and fixed onto the second cover 200, which can simplify the structure of the RFID switch tag device 800 and is easy to use by users. In addition, since the RFID switch tag device 800 is disposed with the activation circuitry 400, the signal enhance circuitry 302 and the at least one ultra-high frequency RFID module 304, so that each of the at least one ultra-high frequency module 304 can be coupled with the signal enhance circuitry 302 via the activation circuitry 400 to form an UHF system having desired performances, such as a long operating range. It should be noted that, a principle of coupling of the signal enhance circuitry 302 with each the ultra-high frequency RFID module 304 via the activation circuitry 400 can refer to the inductive or capacitive coupling disclosed in the U.S. patent application Ser. No. 16/677,663 with a publication No. US20200074258A1, which is not repeated herein.

In some embodiments, as shown in FIG. 1 through FIG. 3, and FIG. 9 through FIG. 11, the RFID switch tag device 800 further includes a slider 500. The slider 500 includes a substrate 504, and a button 502. The substrate 504 is disposed in the accommodating space, and the button 502 is disposed protruding on a side of the substrate 504 facing towards the first cover 100. More specifically, the first cover 100 is defined with an opening 102, the button 502 is arranged penetrating through the opening 102 of the first cover 100. The activation circuitry 400 is fixedly connected to a side of the substrate 504 facing away from the first cover 100. In the illustrated embodiments, the substrate 504 is configured (i.e., structured and arranged) to provide structural supporting for the activation circuitry 400 and the button 502, and a material of the substrate 504 is not limited herein, as long as the substrate 504 can provide the structural supporting effect. Moreover, it should be noted that, in a situation that the tag circuit 300 is provided with only one ultra-high frequency RFID module 304, the button 502 and the opening 102 may be omitted, or not be omitted.

Figure 7:
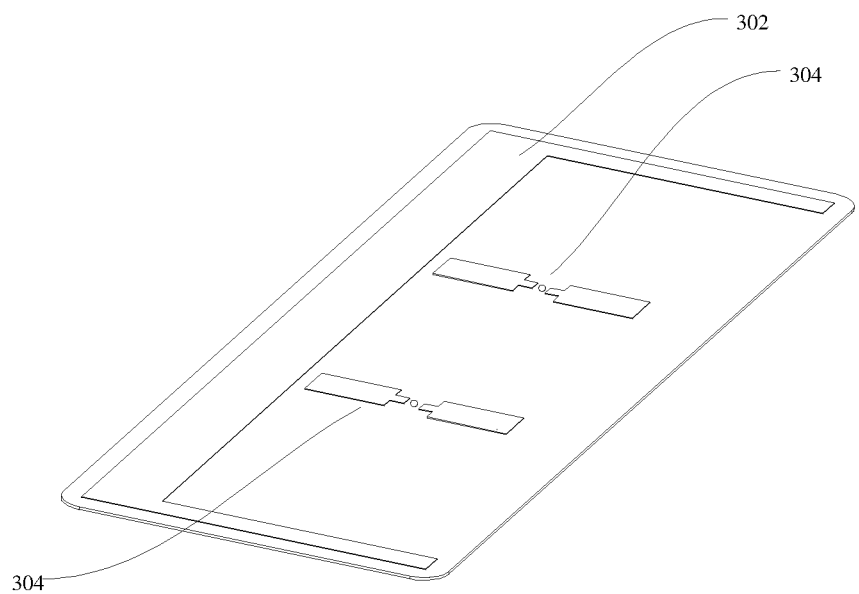
FIG. 7 illustrates a schematic structural top view of another tag circuit with two ultra-high frequency RFID modules according to an embodiment of the present disclosure.
Figure 8:
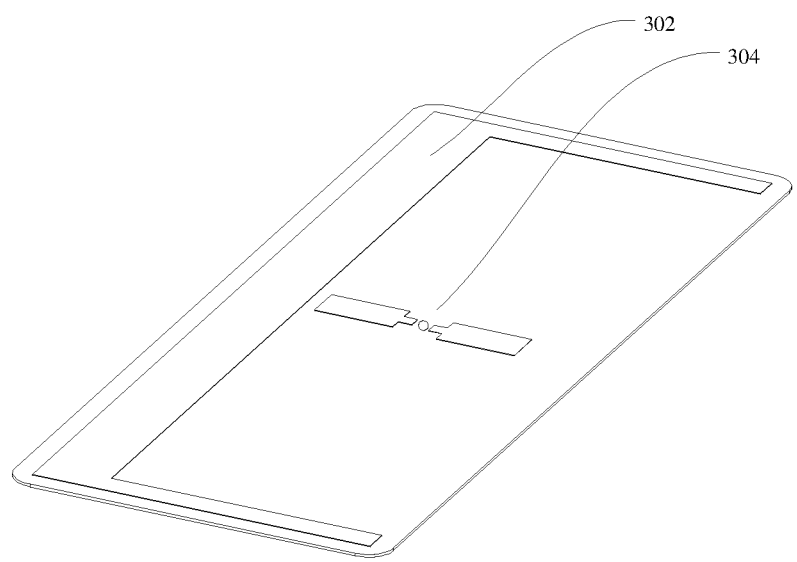
FIG. 8 illustrates a schematic structural top view of still another tag circuit with one ultra-high frequency RFID module according to an embodiment of the present disclosure.

In some embodiments, when the at least one ultra-high frequency RFID module 304 is multiple (e.g., three as shown in FIG. 5, or two as shown in FIG. 7) ultra-high frequency RFID modules 304, the slider 500 is movable relative to the first cover 100 and thereby switchable among multiple positions of the first cover 100, and the activation circuitry 400 couples the signal enhance circuitry 302 with a corresponding one of the multiple ultra-high frequency RFID modules 304 when the slider 500 is in any one of the multiple positions. For example, when there are three ultra-high frequency RFID modules 304, the slider 500 is movable relative to the first cover 100 and thereby switchable among three positions of the first cover 100, and the activation circuitry 400 couples the signal enhance circuitry 302 with a corresponding one of the three ultra-high frequency RFID modules 304 when the slider 500 is in any one of the three positions; or, when there are two ultra-high frequency RFID modules 304, the slider 500 is movable relative to the first cover 100 and thereby switchable among two positions of the first cover 100, and the activation circuitry 400 couples the signal enhance circuitry 302 with a corresponding one of the two ultra-high frequency RFID modules 304 when the slider 500 is in any one of the two positions; but the present disclosure is not limited to these.

In some embodiments, as shown in FIG. 1 through FIG. 4, the RFID switch tag device 800 further includes a holder 600, and the first cover 100 and the second cover 200 together are detachably supported on the holder 600. More specifically, the holder 600 is arranged on a side of the second cover 200 facing away from the first cover 100 when the first cover 100 and the second cover 200 together are supported on the holder 600. In some embodiments, the RFID switch tag device 800 can serve as a windshield tag; correspondingly, the holder 600 of the RFID switch tag device 800 can be attached to a vehicle's windshield using, for example, adhesives (e.g., adhesive strips). When the RFID switch tag device 800 is used as the windshield tag, the RFID switch tag device 800 can be used in various electronic toll collection (ETC) applications.

Figure 12:
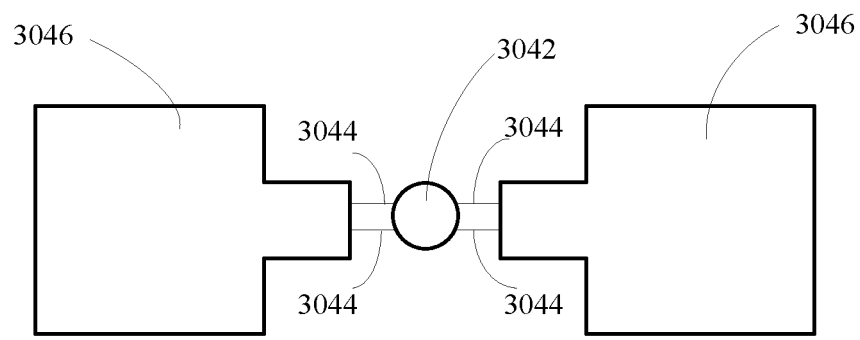
FIG. 12 illustrates a schematic detailed structural view of the ultra-high frequency RFID module in FIG. 5 according to an embodiment of the present disclosure.

In some embodiments, as shown in FIG. 12, each ultra-high frequency RFID module 304 includes a RFID tag chip 3042, and an antenna formed by trace lines 3046. The antenna is connected with the RFID tag chip 3042, for example, through pins 3044 of the trace lines 3046. The trace lines 3046 are arranged on two opposite sides of the RFID tag chip 3042. In some embodiments, each the ultra-high frequency RFID module 304 is operative at a frequency of 915 megahertz (MHz) or 2.45 gigahertz (GHz). In some embodiments, the RFID tag chips 3042 of the multiple ultra-high frequency RFID modules 304 respectively are stored with different groups of tag data, and each group of data in the different groups of tag data include an electronic product code (EPC) and a tag identifier (TID).

Figure 13:
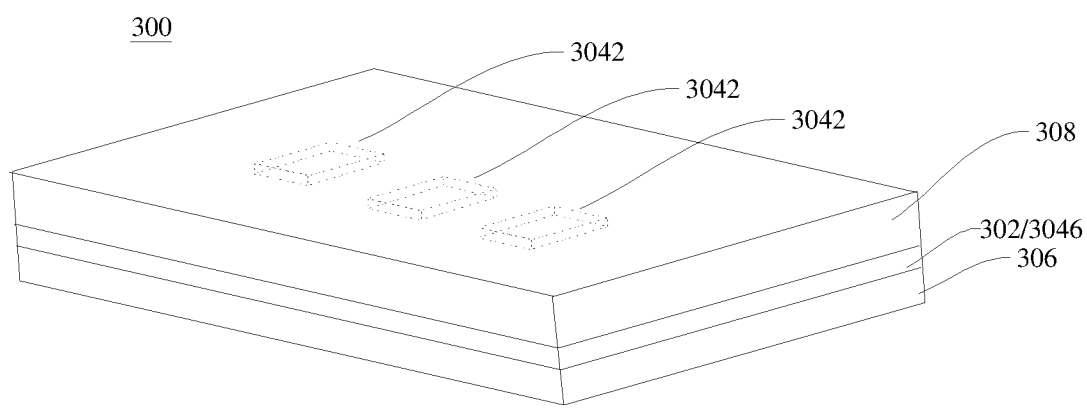
FIG. 13 illustrates a schematic diagram of a layer structure of the tag circuit in FIG. 2 according to an embodiment of the present disclosure.

In some embodiments, as shown in FIG. 4 and FIG. 13, the tag circuit 300 is, through adhesive, fixed onto the second cover 200. For example, the tag circuit 300 further includes: a base 306 and a double-sided adhesive layer 308. Each ultra-high frequency RFID module 304 including the RFID tag chip 3042 and the antenna (formed by the trace lines 3046), and the signal enhance circuitry 302 are arranged between the base 306 and the double-sided adhesive layer 308. The antenna (formed by the trace lines 3046) and the signal enhance circuitry 302 are conductive patterns coplanar on the base 306. The double-sided adhesive layer 308 is pasted onto the second cover 200. As an example, the base 306 may be a polyethylene terephthalate (PET) film, and the antenna (formed by the trace lines 3046) of each ultra-high frequency RFID module 304 and the signal enhance circuitry 302 may be printed on the base 306 by using silver paste or other electrically-conductive paste.

Figure 9:
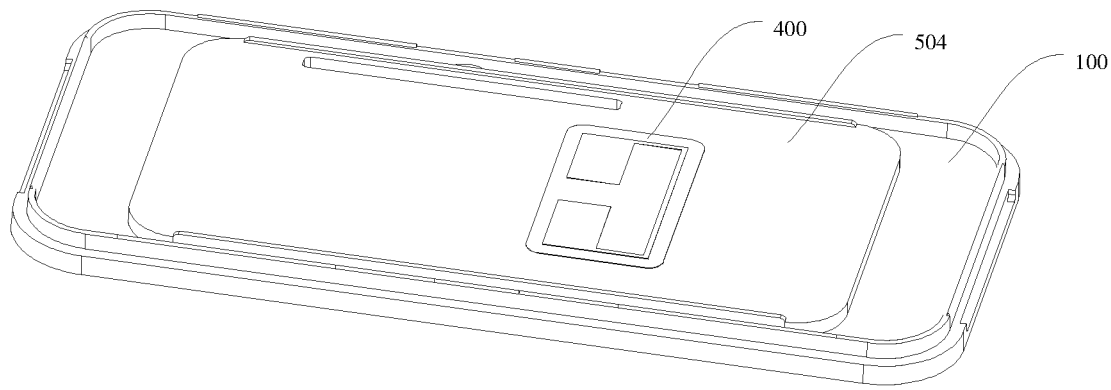
FIG. 9 illustrates a positional relationship between an activation circuitry and a slider of the RFID switch tag device of FIG. 3 according to an embodiment of the present disclosure.
Figure 10:
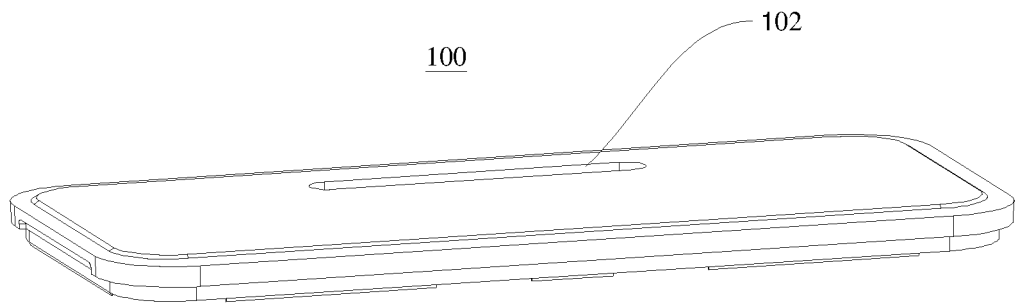
FIG. 10 illustrates a schematic structural perspective view of a first cover in FIG. 1 according to an embodiment of the present disclosure.
Figure 11:
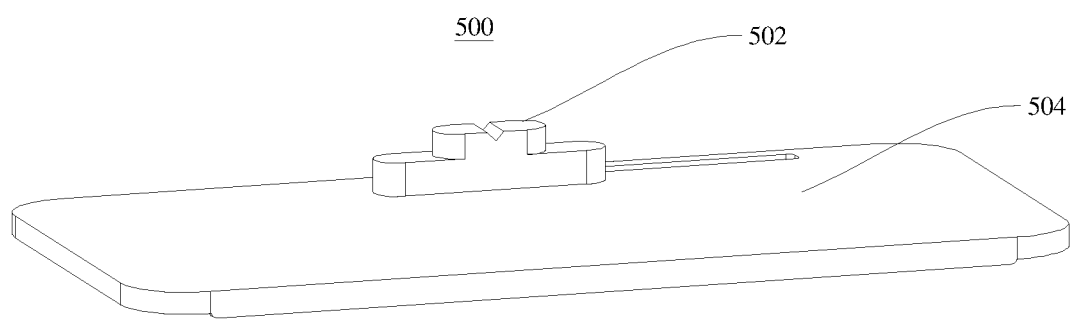
FIG. 11 illustrates a schematic structural perspective view of a slider in FIG. 2 according to an embodiment of the present disclosure.
Figure 14:
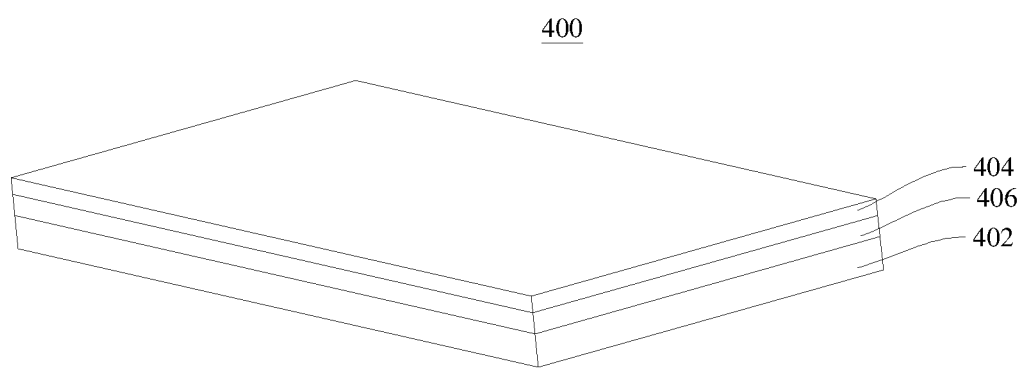
FIG. 14 illustrates a schematic diagram of a layer structure of the activation circuitry in FIG. 2 according to an embodiment of the present disclosure.

In some embodiments, as shown in FIG. 9 and FIG. 14, the activation circuitry 400 includes a base 402, a double-sided adhesive layer 404, and a printed conductive pattern 406 arranged between the base 402 and the double-sided adhesive layer 404. The double-sided adhesive layer 404 is pasted onto the side of the substrate 504 facing away from the first cover 100. The printed conductive pattern 406 is in an open-ring shape, as shown in FIG. 6. Moreover, the base 402 may be a PET film, and the printed conductive pattern 406 may be printed on the base 402 by silver paste or other electrically-conductive paste.

In some embodiments, as shown in FIG. 15A through FIG. 15H, exemplary dimensions of the printed conductive pattern 406 of the activation circuitry 400 are shown. Specifically, the printed conductive pattern 406 includes a first portion 4062, a second portion 4064, and a third portion 4066 connecting the first portion 4062 with the second portion 4064. The first portion 4062 and the second portion 4064 are spaced from each other and define a gap 4068 therebetween. A line width W1 of the first portion 4062 and a line width W2 of the second portion 4064 each are greater than a line width W3 of the third portion 4066. The third portion 4066 is U-shaped and includes two vertical parts and one horizontal part connecting between the two vertical parts. Of course, the third portion 4066 may be other shape instead.

Figure 15A:
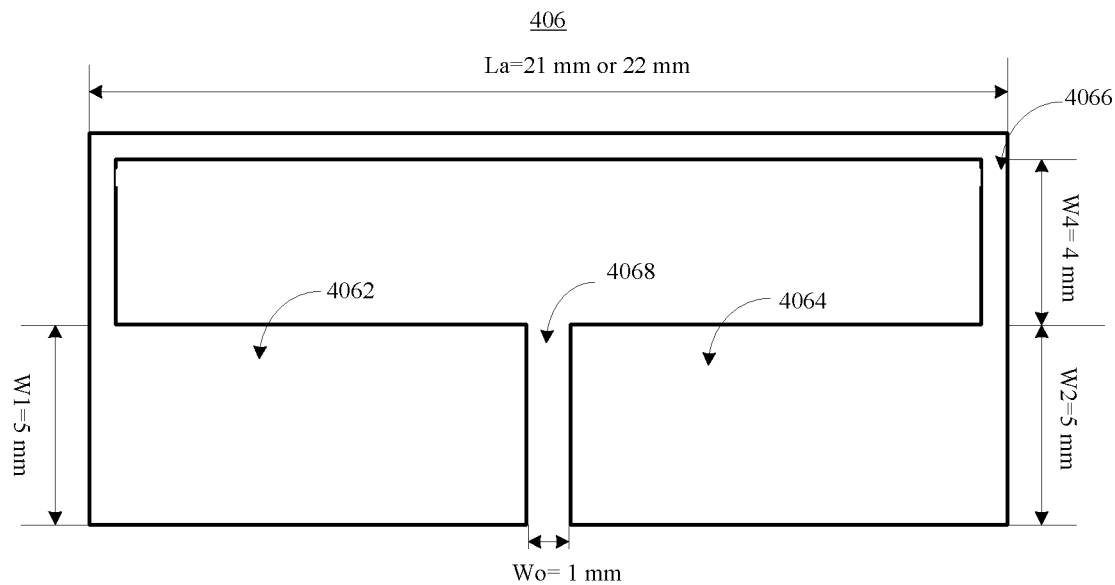
FIG. 15A through FIG. 15H illustrate schematic structural views of a printed conductive pattern of the activation circuitry in FIG. 3 according to an embodiment of the present disclosure, in each of which specific sizes of the printed conductive pattern are shown.

More specifically, as shown in FIG. 15A, the line width W1 of the first portion 4062 and the line width W2 of the second portion 4064 each are 5 mm, a width Wo of the gap 4068 is 1 mm, a length La of the printed conductive pattern 406 is 21 mm or 22 mm, and a width W4 of a region surrounded by the first portion 4062, the second portion 4064 and the third portion 4066, i.e., a distance between the horizontal part of the third portion 4066 and any one of the first portion 4062 and the second portion 4064 is 4 mm.

Figure 15B:
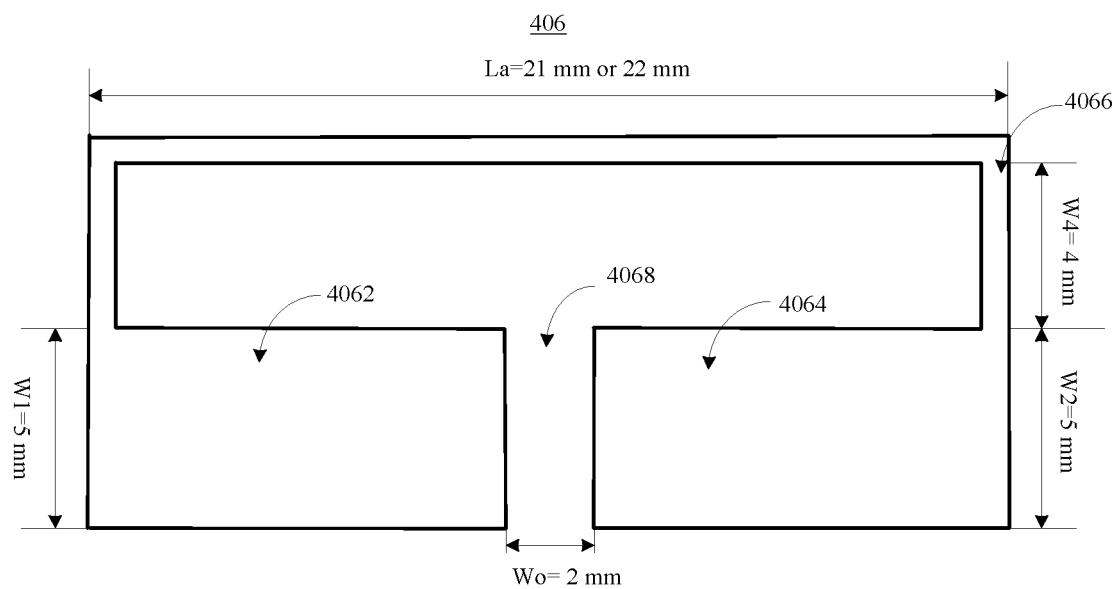

As shown in FIG. 15B, the line width W1 of the first portion 4062 and the line width W2 of the second portion 4064 each are 5 mm, the width Wo of the gap 4068 is 2 mm, the length La of the printed conductive pattern 406 is 21 mm or 22 mm, and the width W4 of the region surrounded by the first portion 4062, the second portion 4064 and the third portion 4066 is 4 mm.

Figure 15C:
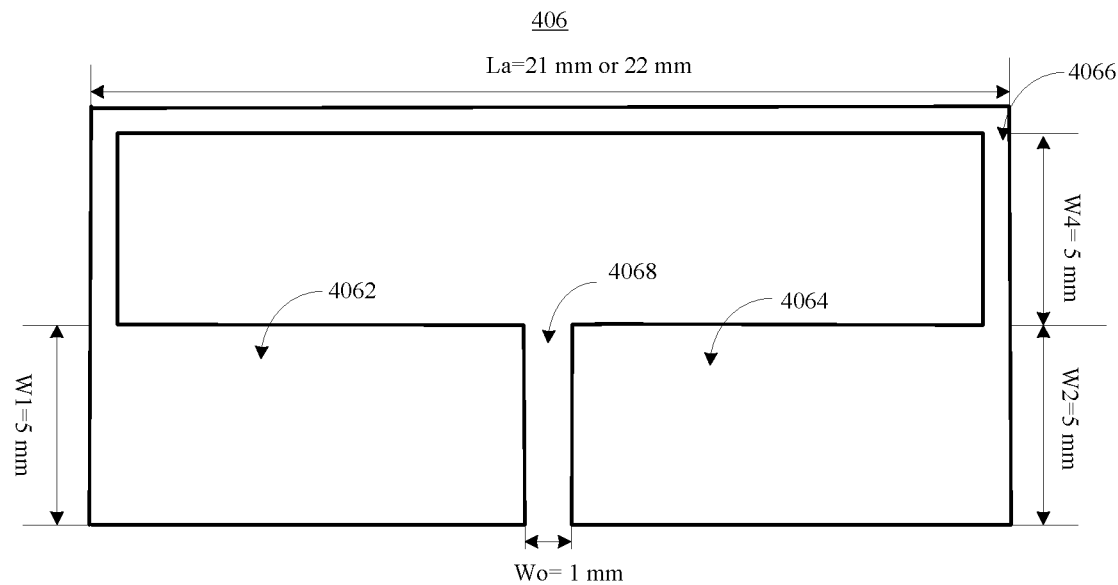

As shown in FIG. 15C, the line width W1 of the first portion 4062 and the line width W2 of the second portion 4064 each are 5 mm, the width Wo of the gap 4068 is 1 mm, the length La of the printed conductive pattern 406 is 21 mm or 22 mm, and the width W4 of the region surrounded by the first portion 4062, the second portion 4064 and the third portion 4066 is 5 mm.

Figure 15D:
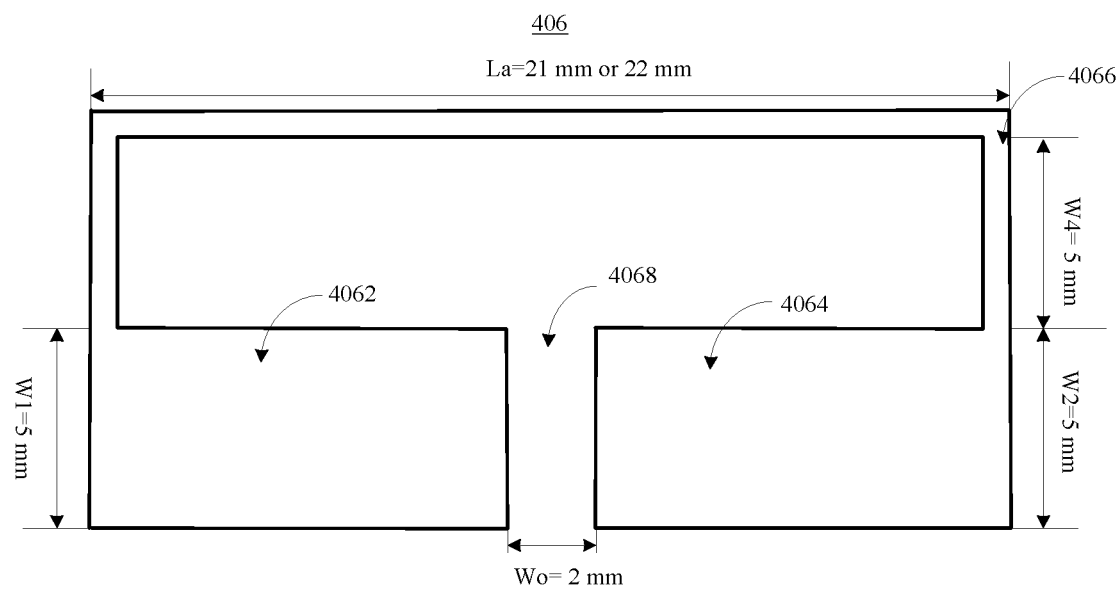

As shown in FIG. 15D, the line width W1 of the first portion 4062 and the line width W2 of the second portion 4064 each are 5 mm, the width Wo of the gap 4068 is 2 mm, the length La of the printed conductive pattern 406 is 21 mm or 22 mm, and the width W4 of the region surrounded by the first portion 4062, the second portion 4064 and the third portion 4066 is 5 mm.

Figure 15E:
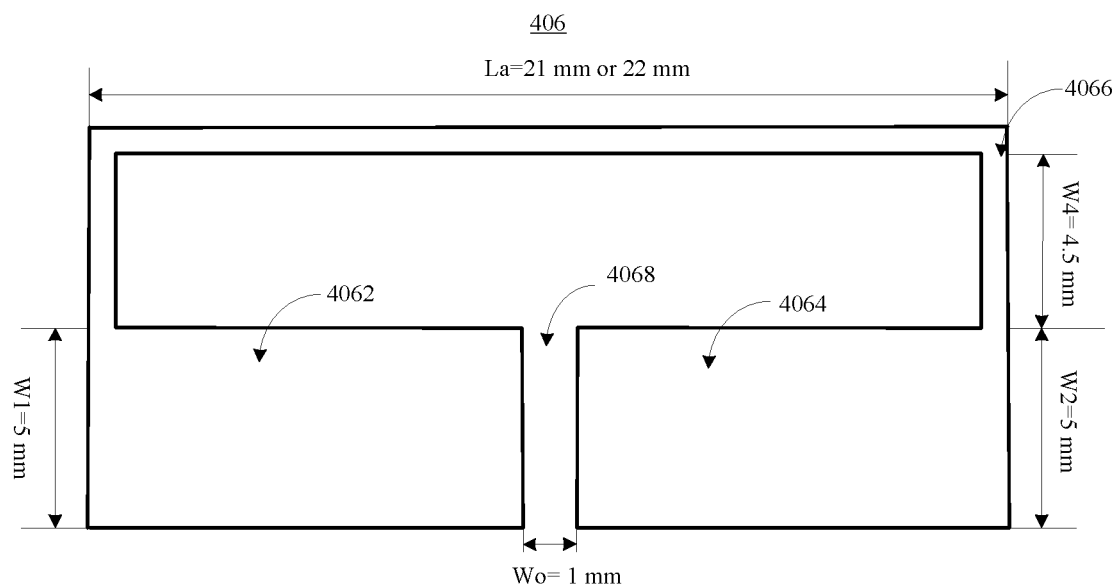

As shown in FIG. 15E, the line width W1 of the first portion 4062 and the line width W2 of the second portion 4064 each are 5 mm, the width Wo of the gap 4068 is 1 mm, the length La of the printed conductive pattern 406 is 21 mm or 22 mm, and the width W4 of the region surrounded by the first portion 4062, the second portion 4064 and the third portion 4066 is 4.5 mm.

Figure 15F:
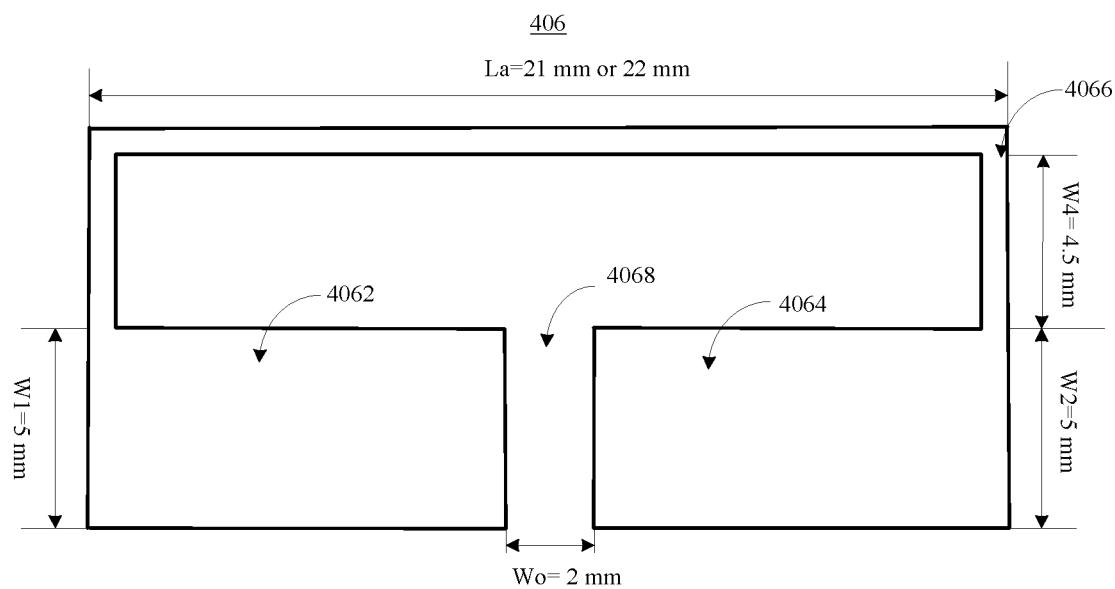

As shown in FIG. 15F, the line width W1 of the first portion 4062 and the line width W2 of the second portion 4064 each are 5 mm, the width Wo of the gap 4068 is 2 mm, the length La of the printed conductive pattern 406 is 21 mm or 22 mm, and the width W4 of the region surrounded by the first portion 4062, the second portion 4064 and the third portion 4066 is 4.5 mm.

Figure 15G:
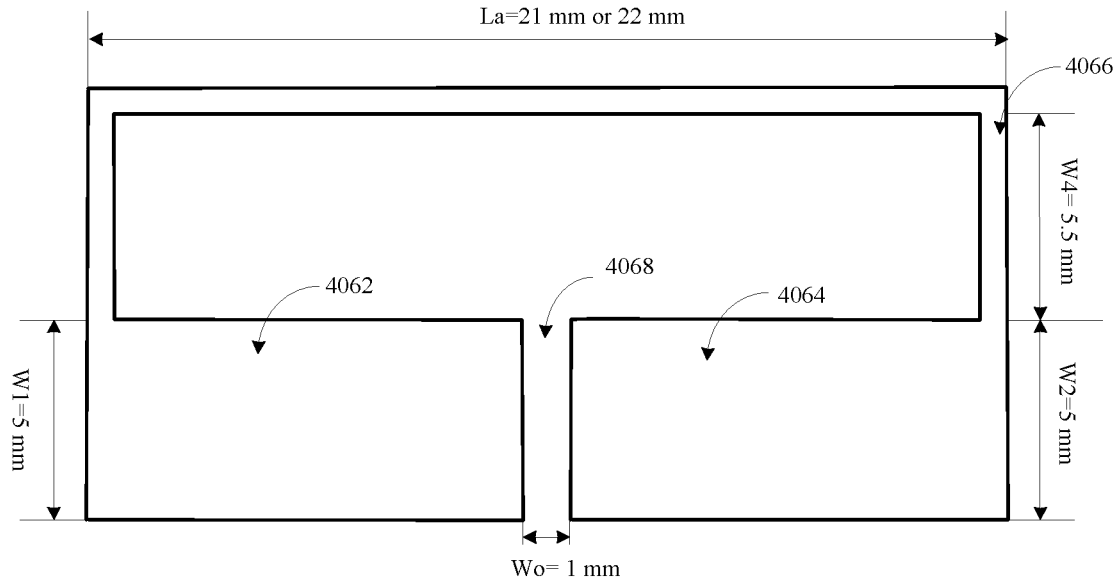

As shown in FIG. 15G, the line width W1 of the first portion 4062 and the line width W2 of the second portion 4064 each are 5 mm, the width Wo of the gap 4068 is 1 mm, the length La of the printed conductive pattern 406 is 21 mm or 22 mm, and the width W4 of the region surrounded by the first portion 4062, the second portion 4064 and the third portion 4066 is 5.5 mm.

Figure 15H:
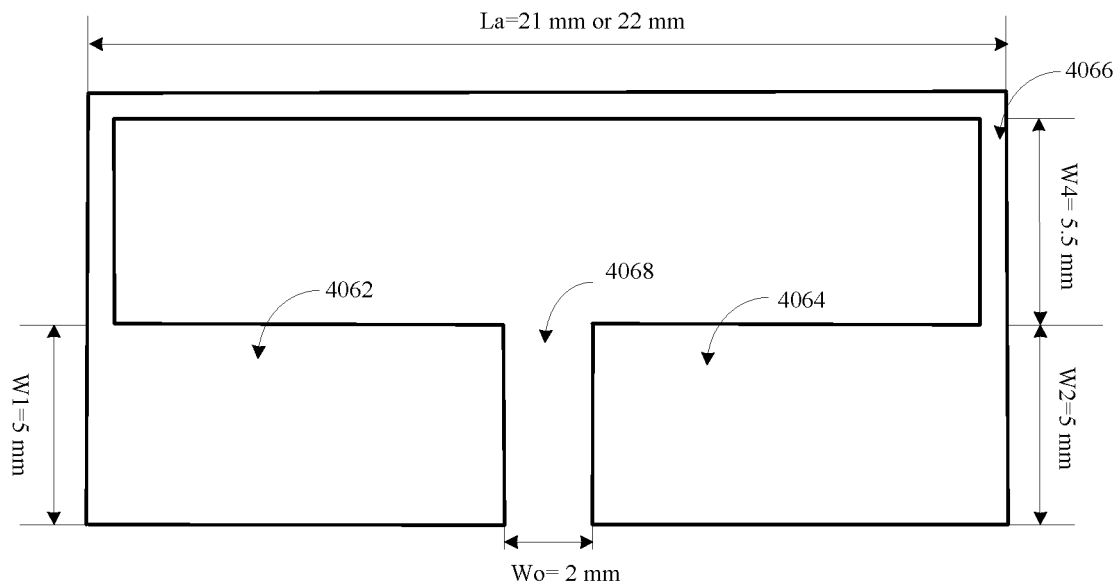

As shown in FIG. 15H, the line width W1 of the first portion 4062 and the line width W2 of the second portion 4064 each are 5 mm, the width Wo of the gap 4068 is 2 mm, the length La of the printed conductive pattern 406 is 21 mm or 22 mm, and the width W4 of the region surrounded by the first portion 4062, the second portion 4064 and the third portion 4066 is 5.5 mm.

Figure 16:
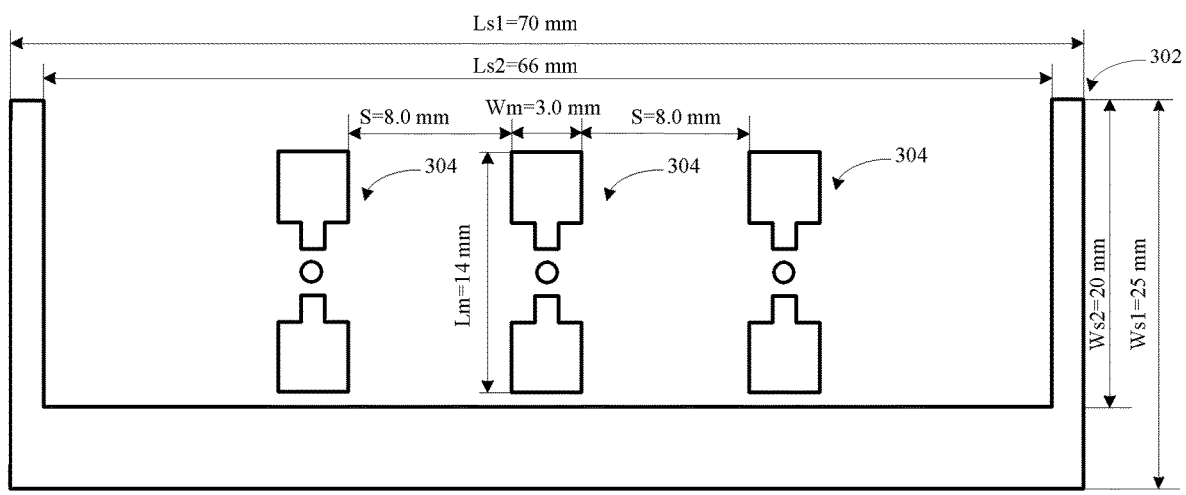
FIG. 16 illustrates a schematic view showing dimensions of three ultra-high frequency RFID modules and a signal enhance circuitry of the tag circuit of in FIG. 6 according to an embodiment of the present disclosure.

In some embodiments, as shown in FIG. 16, exemplary dimensions of the ultra-high frequency RFID modules 304 and the signal enhance circuitry 302 are shown. Specifically, a length Lm of each ultra-high frequency RFID module 304 is 14 mm, a spacing S between each adjacent two ultra-high frequency RFID modules 304 is 8.0 mm, and a width Wm of each ultra-high frequency RFID module 304 is 3.0 mm. Moreover, the signal enhance circuitry 302 includes two vertical portions and one horizontal portion connecting between the two vertical portions, a length Ls1 of the signal enhance circuitry 302 (also referred to a length of the horizontal portion) is 70 mm, a distance Ls2 between the two vertical portions is 66 mm, a width Ws1 of the signal enhance circuitry 302 is 25 mm, and a length Ws2 of each of the two vertical portions is 20 mm.

As seen from FIG. 15A through FIG. 15H, FIG. 16, and FIG. 6, it can be found that the length La of the printed conductive pattern 406 of the activation circuitry 400 is greater than the length Lm of each ultra-high frequency RFID module 304, and the line width W1 of the first portion 4062 and the line width W2 of the second portion 4064 each are greater than the width Wm of each ultra-high frequency RFID module 304.

Figure 17:
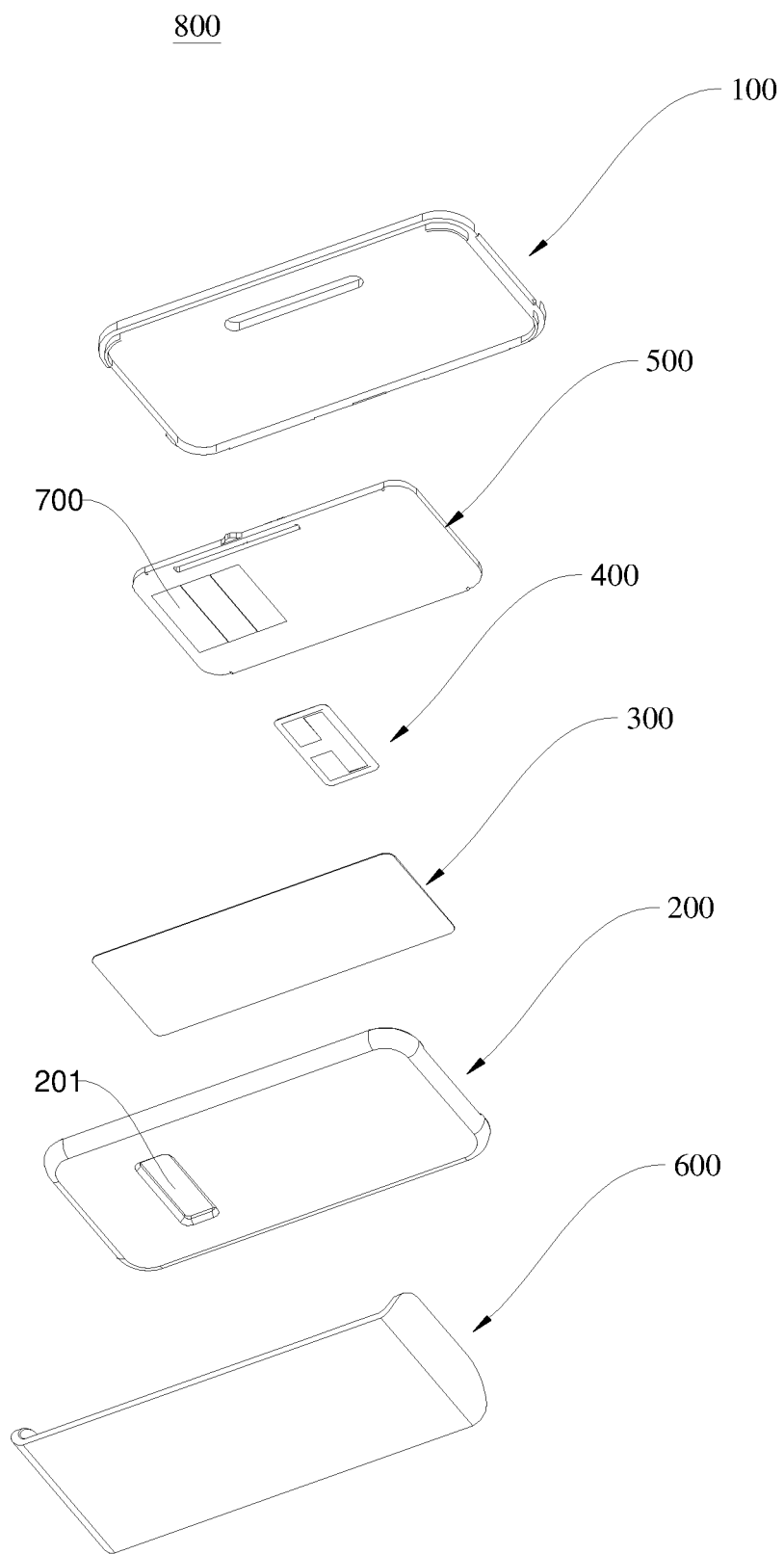
FIG. 17 illustrates a schematic structural exploded view of another RFID switch tag device according to an embodiment of the present disclosure.
Figure 18:
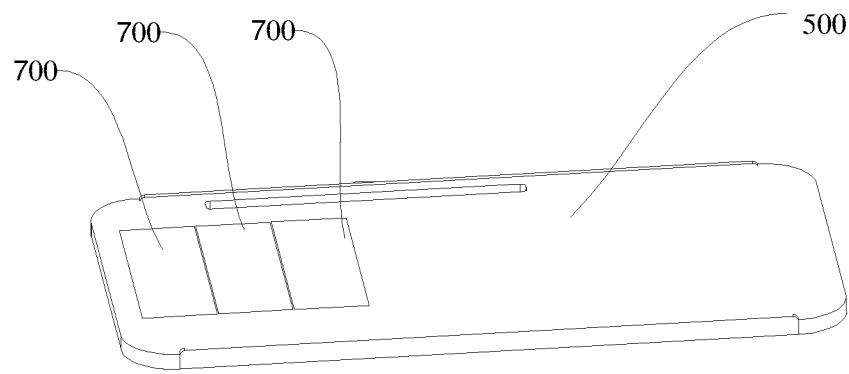
FIG. 18 illustrates a schematic structural view of three color-indicators being disposed on a slider in FIG. 17 according to an embodiment of the present disclosure.

In some embodiments, as shown in FIG. 17 and FIG. 18, the RFID switch tag device 800 further includes at least one color-indicator 700, e.g., three color-indicators 700, and correspondingly the second cover 200 is disposed with a window 201. The three color-indicators 700 are disposed, e.g., printed, on a side of the slider 500 facing towards the second cover 200. The window 201 may be an opening defined on the second cover 200, or a transparent portion of the second cover 200, so that the three color-indicators 700 can be observed through the window 201. In an illustrated embodiment, the three color-indicators 700 can be observed through the window 201 and even a transparent portion of the tag circuit 300, and colors of the three color-indicators 700 may be different ones of yellow, red and green, respectively, but the present disclosure is not limited to this. As an implementation, when RFID switch tag device 800 is equipped with three ultra-high frequency RFID modules 304, the at least one color-indicator 700 is three color-indicators 700 correspondingly; and when the slider 500 moves to make the activation circuitry 400 couple the signal enhance circuitry 302 of the tag circuit 300 with one of the three ultra-high frequency RFID modules 304, a corresponding one of the three color-indicators 700 can be observed through the window 201 of the second cover 200.

As an implementation, in an application scenario, colors of the color-indicators 700 observed through the window 201 are used for indicating the number of personnel in a vehicle on which the RFID switch tag device 800 is installed, for example, yellow color indicates that there is one person in the vehicle, green color indicates that there are two persons in the vehicle, and red color indicates that there are three persons in the vehicle. Specifically, when management personnel, for example a policeman, finds that an actual number of personnel in the vehicle is not consistent with the number of personnel indicated by the color observed through the window 201, the policeman would issue a ticket for penalty. As such, the configuration of the color-indicators 700 and the window 201 facilitates a reinforced declaration of the number of personnel in the vehicle, and thus the window 201 can also be referred to as a reinforced window.

Figure 19:
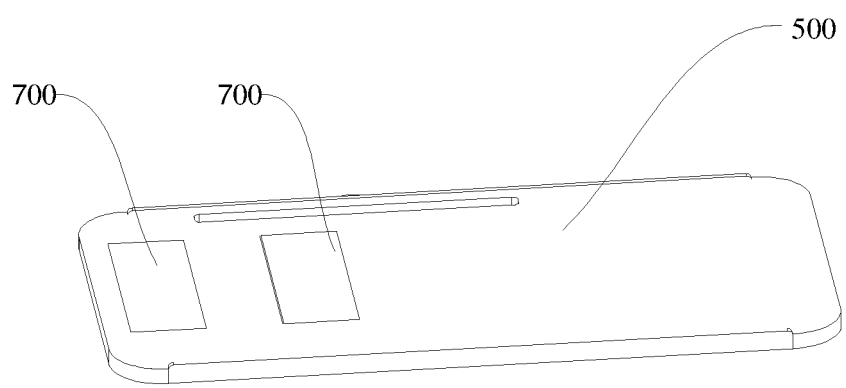
FIG. 19 illustrates a schematic structural view of two color-indicators being disposed on the slider in FIG. 17 according to another embodiment of the present disclosure.
Figure 20:
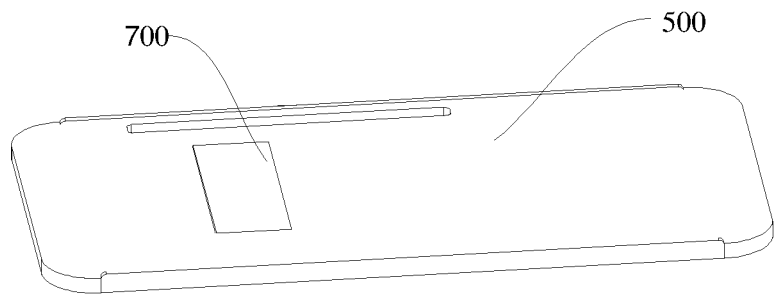
FIG. 20 illustrates a schematic structural view of one color-indicator being disposed on the slider in FIG. 17 according to still another embodiment of the present disclosure.

In some embodiments, the number of the at least one color-indicator 700 is not three, for example, it can be two as shown in FIG. 19, or one as shown in FIG. 20 instead. Correspondingly, the at least one ultra-high frequency RFID module 304 may be two ultra-high frequency RFID modules respectively corresponding to the two color-indicators 700, or the at least one ultra-high frequency RFID module 304 may be one ultra-high frequency RFID module corresponding to the one color-indicator 700.

In addition, as an implementation, in an application scenario, when the at least one ultra-high frequency RFID module 304 is three ultra-high frequency RFID modules 304, the three ultra-high frequency RFID modules 304 can be switchably used for a SOV lane and a HOV lane, for example, they can be used for the HOV lane to get different charge discounts based on the number of personnel in a vehicle; as such, it is only required one RFID switch tag device to apply for three travel conditions, rather than three RFID tag devices for the three travel conditions, thereby simplifying the operation of the user and reducing the device cost.

Moreover, an embodiment of the present disclosure provides a RFID system, which includes a RFID interrogator, and the RFID switch tag device 800. Data can be exchanged between the RFID interrogator and RFID switch tag device 800 via radio transmit signal and radio receive signal. The RFID interrogator may include a RF transceiver, which contains transmitter and receiver electronics, and an antenna, which is configured to generate and receive the radio transit signal and the radio receive signal, respectively. Exchange of data can be accomplished via electromagnetic or electrostatic coupling in the RF spectrum in combination with various modulation and encoding solutions.

The RFID switch tag device 800 disclosed herein can be applied in wireless communication devices having UHF RFID capabilities. The features and attributes of the specific exemplary embodiments disclosed above may be combined in different ways to form additional embodiments, all of which fall within the scope of protection of the present disclosure.

Although the present disclosure provides certain exemplary embodiments and applications, other embodiments that are obvious to those of ordinary skill in the art, including embodiments which do not provide all of the features and advantages set forth herein, are also within the scope of the present disclosure.

What is claimed is:

1. A radio frequency identification (RFID) switch tag device, comprising:
   a first cover and a second cover, cooperatively defining therein an accommodating space;
   a tag circuit, disposed in the accommodating space and fixed onto the second cover, wherein the tag circuit comprises: a signal enhance circuitry, and at least one ultra-high frequency RFID module spaced from the signal enhance circuitry; and
   an activation circuitry, disposed in the accommodating space and located on a side of the tag circuit facing towards the first cover, wherein the activation circuitry couples the signal enhance circuitry with one of the at least one ultra-high frequency RFID module.

2. The RFID switch tag device according to claim 1, wherein the tag circuit is, through adhesive, fixed onto the second cover.

3. The RFID switch tag device according to claim 2, wherein the tag circuit comprises: a base, and a double-sided adhesive layer; the at least one ultra-high frequency RFID module and the signal enhance circuitry are arranged between the base and the double-sided adhesive layer; and the double-sided adhesive layer is pasted onto the second cover.

4. The RFID switch tag device according to claim 3, wherein each of the at least one ultra-high frequency RFID module comprises: a RFID tag chip, and an antenna formed by trace lines; the RFID tag chip is electrically connected with the antenna, and the antenna and the signal enhance circuitry are conductive patterns coplanar on the base.

5. The RFID switch tag device according to claim 1, further comprising a slider;
   wherein the slider comprises a substrate and a button; the substrate is disposed in the accommodating space; and the button is disposed protruding on a side of the substrate facing towards the first cover;
   wherein the first cover is defined with an opening, the button is arranged penetrating through the opening of the first cover, and the activation circuitry is fixedly connected to a side of the substrate facing away from the first cover.

6. The RFID switch tag device according to claim 5, further comprising: at least one color-indicator, disposed on a side of the slider facing towards the second cover;
   wherein the second cover is disposed with a window, and the window is configured to allow a corresponding one of the at least one color-indicator to be observed therethrough when the activation circuitry couples the signal enhance circuitry with one of the at least one ultra-high frequency RFID module.

7. The RFID switch tag device according to claim 5, wherein the activation circuitry comprises: a base, a double-sided adhesive layer, and a printed conductive pattern arranged between the base and the double-sided adhesive layer; the double-sided adhesive layer is pasted onto the side of the substrate facing away from the first cover; and the printed conductive pattern is in an open-ring shape.

8. The RFID switch tag device according to claim 7, wherein the printed conductive pattern comprises a first portion, a second portion, and a third portion connecting the first portion with the second portion; the first portion and the second portion are spaced from each other and define a gap therebetween; and a line width of each of the first portion and the second portion is larger than a line width of the third portion.

9. The RFID switch tag device according to claim 8, wherein the at least one ultra-high frequency RFID module is multiple ultra-high frequency RFID modules, a length of the printed conductive pattern is greater than a length of each of the multiple ultra-high frequency RFID modules, the line width of each of the first portion and the second portion is greater than a width of each of the multiple ultra-high frequency RFID modules; and the activation circuitry couples the signal enhance circuitry with one of the at least one ultra-high frequency RFID module by overlapping the printed conductive pattern with the signal enhance circuitry and the one of the at least one ultra-high frequency RFID module.

10. The RFID switch tag device according to claim 5, wherein the at least one ultra-high frequency RFID module is multiple ultra-high frequency RFID modules, the slider is movable relative to the first cover and thereby switchable among a plurality of positions of the first cover, and the activation circuitry couples the signal enhance circuitry with a corresponding one of the multiple ultra-high frequency RFID modules when the slider is in any one of the plurality of positions.

11. The RFID switch tag device according to claim 10, further comprising: multiple color-indicators, disposed on a side of the slider facing towards the second cover;
wherein the second cover is disposed with a window, and a corresponding one of the multiple color-indicators is observed through the window of the second cover and a transparent portion of the tag circuit when the slider is in any one of the plurality of positions.

12. The RFID switch tag device according to claim 10, wherein each of the multiple ultra-high frequency RFID modules comprises: a RFID tag chip, and an antenna formed by trace lines; the antenna is electrically connected with the RFID tag chip, and the RFID tag chips of the multiple ultra-high frequency RFID modules respectively are stored with different groups of tag data, and each group of data in the different groups of tag data comprise an electronic product code (EPC) and a tag identifier (TID);
wherein the RFID switch tag device further comprises a holder, and the first cover and the second cover together are detachably supported on the holder.

13. A RFID switch tag device, comprising:
a first cover and a second cover, cooperatively defining therein an accommodating space;
a tag circuit, disposed in the accommodating space and attached onto the second cover by adhesive, wherein the tag circuit comprises: a signal enhance circuitry, and at least one ultra-high frequency RFID module spaced from the signal enhance circuitry; each of at least one ultra-high frequency RFID module comprises a RFID tag chip and an antenna formed by trace lines, the antenna is electrically connected with the RFID tag chip, and the signal enhance circuitry and the antenna are conductive patterns coplanar; and
an activation circuitry, disposed in the accommodating space and configured to couple the signal enhance circuitry with one of the at least one ultra-high frequency RFID module.

14. The RFID switch tag device according to claim 13, further comprising a slider;
wherein the slider comprises a substrate and a button; the substrate is disposed in the accommodating space; and the button is disposed protruding on a side of the substrate facing towards the first cover;
wherein the first cover is defined with an opening, the button is arranged penetrating through the opening of the first cover, and the activation circuitry is fixed onto a side of the substrate facing away from the first cover.

15. The RFID switch tag device according to claim 14, wherein the at least one ultra-high frequency RFID module is multiple ultra-high frequency RFID modules, the slider is movable relative to the first cover and thereby switchable among a plurality of positions of the first cover, and the activation circuitry couples the signal enhance circuitry with a corresponding one of the multiple ultra-high frequency RFID modules when the slider is in any one of the plurality of positions.

16. The RFID switch tag device according to claim 14, further comprising: at least one color-indicator, disposed on a side of the slider facing towards the second cover;
wherein the second cover is disposed with a window, and the window is configured to allow a corresponding one of the at least one color-indicator to be observed therethrough when the activation circuitry couples the signal enhance circuitry with one of the at least one ultra-high frequency RFID module.

17. The RFID switch tag device according to claim 14, wherein the activation circuitry comprises: a base, a double-sided adhesive layer, and a printed conductive pattern arranged between the base and the double-sided adhesive layer; the double-sided adhesive layer is pasted onto the side of the substrate facing away from the first cover, and the printed conductive pattern is in an open-ring shape.

18. The RFID switch tag device according to claim 17, wherein the printed conductive pattern comprises a first portion, a second portion, and a third portion connecting the first portion with the second portion; the first portion and the second portion are spaced from each other and define a gap therebetween;
wherein the at least one ultra-high frequency RFID module is multiple ultra-high frequency RFID modules, a length of the printed conductive pattern is greater than a length of each of the multiple ultra-high frequency RFID modules, a line width of each of the first portion and the second portion is greater than a width of each of the multiple ultra-high frequency RFID modules; and the activation circuitry couples the signal enhance circuitry with one of the at least one ultra-high frequency RFID module by overlapping the printed conductive pattern with both the signal enhance circuitry and the one of the at least one ultra-high frequency RFID module.

19. A RFID switch tag device, comprising:
a first cover and a second cover, cooperatively defining therein an accommodating space;
a tag circuit, disposed in the accommodating space and fixed onto the second cover, wherein the tag circuit comprises: a signal enhance circuitry, and multiple ultra-high frequency RFID modules spaced from the signal enhance circuitry;
a slider, slidably mounted on the first cover; and
an activation circuitry, disposed in the accommodating space and fixed onto the slider, wherein the activation circuitry is configured to switchably couple the signal enhance circuitry with one of the multiple ultra-high frequency RFID modules; the activation circuitry comprises: a base, a double-sided adhesive layer, and a conductive pattern arranged between the base and the double-sided adhesive layer; the double-sided adhesive layer is pasted onto the slider, and the conductive pattern is in an open-ring shape.

20. The RFID switch tag device according to claim 19, wherein the slider is switchable among a plurality of positions of the first cover, and the activation circuitry couples the signal enhance circuitry with a corresponding one of the multiple ultra-high frequency RFID modules when the slider is in any one of the plurality of positions;

wherein the RFID switch tag device further comprises:
multiple color-indicators, disposed on a side of the slider facing towards the second cover;
wherein the second cover is disposed with a window, and a corresponding one of the multiple color-indicators is observed through the window of the second cover when the slider is in any one of the plurality of positions;
wherein the conductive pattern comprises a first portion, a second portion, and a third portion connecting the first portion with the second portion; the first portion and the second portion are spaced from each other and define a gap therebetween, and a line width of each of the first portion and the second portion is larger than a line width of the third portion.

* * * * *